(12) United States Patent
Karles et al.

(10) Patent No.: US 8,555,896 B2
(45) Date of Patent: Oct. 15, 2013

(54) ACTIVATED CARBON FROM MICROCRYSTALLINE CELLULOSE

(75) Inventors: Georgios D. Karles, Richmond, VA (US); Shuzhong Zhuang, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 1112 days.

(21) Appl. No.: 12/002,774

(22) Filed: Dec. 19, 2007

(65) Prior Publication Data
US 2009/0159091 A1      Jun. 25, 2009

(51) Int. Cl.
*A24B 15/00* (2006.01)

(52) U.S. Cl.
USPC .......................... 131/342; 264/29.1; 264/29.4

(58) Field of Classification Search
USPC ............... 131/342, 331; 423/447.7; 264/29.1, 264/29.4
See application file for complete search history.

(56) References Cited

U.S. PATENT DOCUMENTS

| | | | |
|---|---|---|---|
| 3,104,159 A | 9/1963 | Davidson et al. | |
| 3,351,071 A | 11/1967 | Belfort | |
| 3,400,181 A | 9/1968 | Battista et al. | |
| 3,639,266 A | 2/1972 | Battista | |
| 4,012,476 A | 3/1977 | Mizuma et al. | |
| 5,204,310 A | 4/1993 | Tolles et al. | |
| 5,521,008 A | 5/1996 | Lieberman et al. | |
| 6,316,378 B1 | 11/2001 | Giebelhausen et al. | |
| 6,365,216 B1 | 4/2002 | Dron et al. | |
| 2002/0028333 A1 | 3/2002 | Giebelhausen et al. | |
| 2003/0157014 A1 | 8/2003 | Wang et al. | |
| 2004/0237790 A1 | 12/2004 | von Blucher et al. | |
| 2005/0011827 A1* | 1/2005 | Koslow | 210/503 |
| 2005/0155615 A1 | 7/2005 | Rohdewald et al. | |
| 2007/0265161 A1* | 11/2007 | Gadkaree et al. | 502/417 |

FOREIGN PATENT DOCUMENTS

| | | |
|---|---|---|
| EP | 1 468 718 A1 | 10/2004 |
| GB | 247241 | 2/1926 |
| JP | 49-083690 A | 8/1974 |
| JP | 03106443 A | 5/1991 |
| JP | 03242310 A | 10/1991 |
| JP | 11001311 A | 1/1999 |
| WO | WO 02/083557 A1 | 10/2002 |
| WO | WO 03/072498 A1 | 9/2003 |
| WO | WO 2004/103099 A2 | 12/2004 |
| WO | WO 2007/069094 A2 | 6/2007 |
| WO | WO 2007/131795 A2 | 11/2007 |

OTHER PUBLICATIONS

International Search Report and Written Opinion mailed Feb. 5, 2010 for PCT/EP2008/010794.
International Preliminary Report on Patentability issued Jun. 22, 2010 for PCT/EP2008/010794.

* cited by examiner

*Primary Examiner* — Richard Crispino
*Assistant Examiner* — Dionne Walls Mayes
(74) *Attorney, Agent, or Firm* — Buchanan Ingersoll & Rooney PC

(57) ABSTRACT

A method of forming activated carbon from microcrystalline cellulose comprises converting the microcrystalline cellulose powder into microcrystalline cellulose beads using extrusion and spheronization, carbonizing microcrystalline cellulose to form carbonized microcrystalline cellulose and activating the carbonized microcrystalline cellulose to form activated carbon. The final size of the activated carbon beads, which preferably are of practically spherical shape, can be controlled through the process of making microcrystalline cellulose beads.

16 Claims, 1 Drawing Sheet

ACTIVATED CARBON FROM MICROCRYSTALLINE CELLULOSE

SUMMARY

A method of forming activated carbon from microcrystalline cellulose comprises carbonizing microcrystalline cellulose to form carbonized microcrystalline cellulose and activating the carbonized microcrystalline cellulose to form activated carbon.

BRIEF DESCRIPTION OF THE DRAWING FIGURES

DETAILED DESCRIPTION OF PREFERRED EMBODIMENTS

Figure 1:
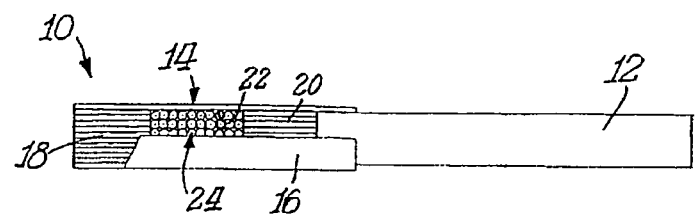
FIG. 1 is a partially-broken away side view of an embodiment of a cigarette comprising a tobacco rod and a filter comprising activated carbon beads.

A method of forming activated carbon from microcrystalline cellulose (MCC) comprises carbonizing microcrystalline cellulose to form carbonized microcrystalline cellulose and activating the carbonized microcrystalline cellulose to form activated carbon.

The activated carbon can be produced beginning with MCC powder, which is first mixed with water or other appropriate aqueous solvent to produce a wet mass. In particular, about 30-70 weight %, for example, about 40-60 weight %, solids or solids mixture (i.e., MCC powder) and about 30-70%, for example, about 40-60 weight %, water can be mixed. The wet mass is formed into cylindrical extrudates using an extruder. The wet cylindrical extrudates are then broken down, densified, and formed into spherical beads using a spheronizer. The beads are dried, for example, using a fluid bed dryer or vacuum dryer. The dried beads are carbonized at a temperature in the range of about 400 to 950° C., for example at about 900° C., preferably under nitrogen flow. Carbonization yields, as measured by ThermoGravimetric Analysis (TGA), are preferably on the order of 25%, which is higher than those of other cellulose precursors, potentially due to the high crystallinity of MCC. Finally, the carbonized beads are activated at a temperature in the range of about 800 to 950° C., for example at about 850° C.

In the carbonization step, the precursors are heated up under an inert environment to remove non-carbon elements. Carbonization starts to occur at about 300° C. and the end temperature is between about 800 and 1000° C. In the activation step, steam or $CO_2$ reacts with carbon to create angstrom sized pores. These reactions are endothermic and will not occur below about 800° C. Thus, the carbonization and activation steps can be performed in a single step. However, by the time the temperature is raised to 800° C., most of the precursor has been carbonized. In an embodiment discussed further below, activation using chemicals (e.g., $H_3PO_4$ and/or $ZnCl_2$) is a one-step process.

Alternatively, the activated carbon beads can be produced beginning with commercially available MCC beads, such as Ethispheres® from NP Pharm, Bazainville, France. Specifically, Ethispheres® 600 have sizes ranging from 500 to 710 microns and Ethispheres® 850 have sizes ranging from 710 to 1,000 microns. Ethispheres® 250 have sizes ranging from 200 to 355 microns and Ethispheres® 450 have sizes ranging from 355 to 500 microns. Specific, exemplary activation conditions (i.e., temperature, atmosphere, and time) performed on two (2) samples each of Ethispheres® 600 and Ethispheres® 850 are presented in Table I.

TABLE I

| Sample | MCC beads | Temperature (° C.) | $H_2O$ (mol/min) | $N_2$ (mol/min) | Time (min) | Percent Burn-off |
|---|---|---|---|---|---|---|
| A | Ethispheres ® 600 | 850 | 0.042 | 0.044 | 90 | 29.4 |
| B | Ethispheres ® 600 | 850 | 0.042 | 0.044 | 180 | 57.5 |
| C | Ethispheres ® 850 | 850 | 0.042 | 0.044 | 90 | 28.0 |
| D | Ethispheres ® 850 | 850 | 0.042 | 0.044 | 180 | 52.0 |

Density and porosity data for Samples A-D of Table I, after activation of the Ethispheres®, is presented in Table II.

TABLE II

|  |  | Sample A | Sample B | Sample C | Sample D |
|---|---|---|---|---|---|
| Argon Adsorption | BET Area ($m^2/g$) | 1164 | 1885 | 1132 | 1711 |
|  | Micropore Volume (mL/g) | 0.394 | 0.639 | 0.384 | 0.586 |
|  | Total Volume (mL/g) | 0.396 | 0.674 | 0.389 | 0.604 |
| Mercury Intrusion | Intrusion Volume (mL/g) | 1.09 | 1.65 | 0.94 | 1.23 |
|  | Pore Area ($m^2/g$) | 76 | 190 | 77 | 150 |
|  | Bulk Density (g/mL) | 0.49 | 0.36 | 0.53 | 0.43 |
|  | Porosity (%) | 52.9 | 58.8 | 49.8 | 53.2 |

Before carbonization and activation, the Ethispheres® are agglomerations of fibrous particles, wherein the fibrous particles are composites of individual fibers having diameters in the range of about 100 to 200 nm. Carbonization and activation of the Ethispheres® result in the formation of beads having a hard, brittle shell that contains surface and internal pores having sizes in the range of about 0.5 to 5 microns. The carbonization and activation also changes the internal morphology of the beads, resulting in a smoother surface texture that contain a random network of pores similar to those in the shell.

The porosity of the activated carbon beads can be controlled by the porosity of the starting beads or by the use of gas evolving or foaming precursors mixed together with the MCC prior to carbonization. For example, sodium or ammonium bicarbonate can be used to generate macroporosity within the MCC beads as they are heated up during carbonization. The weight ratio of sodium or ammonium bicarbonate to MCC can be in the range of about 0:1 to about 1:1, for example, about 0:1 to about 1:2. Further, MCC beads highly free of inorganic impurities such as, for example, iron, sulfur, nitrogen, etc can be provided. Thus, impurities in the activated carbon beads can be controlled.

In an embodiment, MCC may be mixed with activated carbon powder, for example, highly activated carbon powder, prior to being made into beads. The weight ratio of activated carbon powder to MCC can be in the range of about 0:1 to about 1:1, for example, about 0:1 to about 1:2. Following activation, such beads could possess significant adsorption capacity due to the presence of the preactivated carbon powder.

In another embodiment, MCC may be mixed with carbonizable precursors prior to being made into beads. The weight ratio of carbonizable precursors to MCC can be in the range of about 0:1 to about 2:1, for example, about 0:1 to about 1:2. The carbonizable precursor may be selected from materials with high yields following carbonization, such as, for example, phenolic powders. The MCC may help to immobilize the phenolics in the beads during the carbonization step, which preferably involves curing temperatures above the melting point of the phenolic material. The mixed phenolic may comprise a highly concentrated solution of low molecular phenolics (i.e., pitch may also be used), which is combined with MCC prior to extrusion and spheronization. Depending on the phenolic precursor used, carbons with different structures may be formed, as a result of phenolic precursor being present in different size domains within the MCC matrix. Phenolic powder is expected to result in larger domains as opposed to phenolic solutions. Phenolic precursors have significantly higher yields of carbonization (approximately 50%) as opposed to MCC and can result in strong beads with controllable microporosities following further activation of the carbonized beads.

Additionally, the yield of carbonization may be increased by mixing $H_2SO_4$, $H_3PO_4$ or salts like $ZnCl_2$ with the carbonizable material. In particular, $H_2SO_4$ can be used to adjust pH, while the weight ratio of $ZnCl_2$ to MCC can be in the range of about 0:1 to about 2:1, for example, about 0:1 to about 1:2. An aqueous solution of $H_3PO_4$ having a concentration range of, for example, about 10-40%, can be used, with about 30-70 weight %, for example, about 40-60 weight %, solids or solids mixture (i.e., MCC powder) and about 30-70%, for example, about 40-60 weight %, aqueous solution of $H_3PO_4$.

Beads made by mixing MCC with carbon powder are preferably made to have selective filtration properties. This may be accomplished by premixing specific selective filtration additives in the mixture. For example, poly(ethyleneimine) (PEI) resin may be added to selectively react with aldehydic compounds and/or other organosilane precursors with specific terminal groups may be used to anchor onto the hydroxyl groups of the MCC. Alternatively, selective filtration properties may be achieved by impregnating the beads.

The MCC beads can be overcoated prior to or after carbonization and/or activation to control porosity and selectivity and/or to provide a membrane on the beads. Thus, the beads may have controlled adsorption properties as the carbonized or noncarbonized overcoat may possess specific porosities or specific selectivities towards certain targeted compounds or constituents of fluids such as gases or liquids. For example, the beads may be overcoated by spraying with synthetic or natural polymer solutions or dispersions, preferably in a fluidized bed, to produce overcoats that provide a membrane over the central adsorbent core. Such coated beads may be used in filtration or purification applications involving liquids or gases and the membrane may be chosen to have selective properties based on its polarity or porosity and swelling in the process medium during filtration or purification. The properties of the membrane may also be adjusted by changing filtration or purification conditions (e.g., temperature, pH, etc.). Similarly, membranes of tailored porosities produced following carbonization and/or activation of the membrane may be chosen to have selective properties based on its polarity, porosity and/or swelling in the process medium during filtration or purification and the properties of the membrane may also be adjusted by changing filtration and/or purification conditions.

The beads retain their shape throughout carbonization and activation, but can shrink in size. Thus, carbonization and activation of Ethispheres® resulted in activated carbon beads of a practically spherical shape. Further, the final size of the activated carbon beads, which are preferably spherical, can be controlled through selection of the size of the starting Ethispheres® or beads formed using, for example, a spheronizer. The attrition resistance of the activated carbon beads allows for activated carbon that does not smear or break under applied pressure.

The measured average diameters of untreated Ethispheres® 850, carbonized Ethispheres® 850, activated carbon beads formed from Ethispheres® 850, and highly activated carbon beads formed from Ethispheres® 850 were 885±65 microns (n=15), 645±50 microns (n=15), 590±70 microns (n=15), and 530±65 microns (n=15), respectively. The measured average diameters of untreated Ethispheres® 600, carbonized Ethispheres® 600, activated carbon beads formed from Ethispheres® 600, and highly activated carbon beads formed from Ethispheres® 600 were 617±40 microns (n=15), 425±40 microns (n=15), 385±35 microns (n=15), and 360±45 microns (n=15), respectively.

Thus, carbonization can result in approximately a 30% decrease in bead diameters (i.e., compare untreated Ethispheres® 850 at 885±65 microns and carbonized Ethispheres® 850 at 645±50 microns), activation can result in approximately a 40% decrease in bead diameters (i.e., compare Ethispheres® 850 at 885±65 microns and activated carbon beads formed from Ethispheres® 850 at 590±70 microns), and high activation can result in approximately a 45 to 50% decrease in bead diameters (i.e., compare Ethispheres® 850 at 885±65 microns and highly activated carbon beads formed from Ethispheres® 850 at 530±65 microns). Thus, use of MCC as a precursor allows for control of the final size and shape of activated carbon.

Untreated Ethispheres® 600 and Ethispheres® 850, carbonized Ethispheres® 600 and Ethispheres® 850, activated carbon beads formed from Ethispheres® 600 and Ethispheres® 850, and highly activated carbon beads formed from Ethispheres® 600 and Ethispheres® 850 were each placed into separate ceramic mortars immersed in liquid nitrogen. The beads were fractured by shearing between the mortar and pestle at a temperature of about −196° C. A brush was used to move the particles onto weighing paper and the unfractured beads were separated. The fractured particles were placed onto 12 mm diameter carbon adhesive disks that were attached to Al stubs. Each sample of fractured particles was placed into a Hummer 6.6 Turbo Sputter Coater™ operating in argon and sputter coated with 2 nm of Au—Pd. The interior and exterior surfaces of the fractured particles were imaged using an XL30 Environmental Scanning Electron Microscope (ESEM), manufactured by FEI Company™, operating at 15 kV in Hi-Vac (high vacuum) mode.

The untreated Ethispheres® were agglomerations of fibrous particles. The fibers that made up these particles, some of which were elongated, were about 100 to 200 nm in diameter. The bead surfaces were textured but not extremely rough, and the agglomerated particles were clearly observable.

Carbonizing and activating the Ethispheres® resulted in a change in the internal morphology of the agglomerated particles to a smoother surface texture that contained a random network of pores, and also in the formation of a porous shell. The internal pores were typically less than 5 microns in size. The shell surfaces also contained pores, and some of these pores could have formed because of the presence of hollow channels extending through the entire cross section of the shell. On the shell surface cracks were sometimes observed to propagate on sharply defined planes that often extended from pore to pore. The fracture surfaces were jagged on nearly all of the shell cross sections, indicating that the shell material is most likely hard and brittle.

Activation produces activated carbon beads having a desired pore structure, i.e., the majority of the pores have a size of less than about 30 Å, more preferably less than about 20 Å, and even more preferably less than about 10 Å, and the micropore volume (pore volume/gram) of the pores calculated using the Density Functional Theory (DFT) that have a pore size in the range of about 5 to 10 Å is preferably in the range of about 0.2 to 1.0 $cm^3/g$, more preferably about 0.3 to 1.0 $cm^3/g$. Activation utilizes any suitable oxygen-containing environment, which contains steam, carbon dioxide, oxygen or potassium hydroxide solution. The environment can also contain other gases, such as nitrogen. These gases react with the carbon, resulting in a porous carbon structure. Oxygen and nitrogen can also be chemically attached to the carbon surface to enhance gas filtration selectivity based on chemisorption, i.e., the formation of a covalent bond.

In a preferred embodiment, carbonized beads are activated to a desired level of burn-off. The "burn-off" represents the weight loss (i.e., weight loss=initial weight−final weight) of the carbon that occurs during activation. As the level of burn-off is increased, the carbon surface area increases. The BET (Brunauer, Emmett and Teller) surface area of the activated carbon beads is preferably in the range of about 1,000 to 3,000 $m^2/g$, more preferably about 1,000 to 2,000 $m^2/g$.

During activation, burn-off is preferably controlled to control the pore size, pore surface area and/or pore volume of the activated carbon beads. At a given activation temperature, increasing the activation time increases the BET surface area and the pore volume/gram of the activated material. In addition, increasing the activation time can cause the growth of small pores (e.g., pores having a size in the range of about 5 to 10 Å) into larger pores (e.g., pores having a size in the range of about 10 to 20 Å). Accordingly, the activation time is preferably regulated to control pore growth and provide a desired pore size distribution. In a preferred embodiment, the majority of the pores of the activated carbon beads have a size of less than about 30 Å, more preferably less than about 20 Å, and even more preferably less than about 10 Å.

Adsorbent and/or absorbent materials (i.e., sorbents), such as activated carbon, can be incorporated into smoking articles, such as cigarettes, for the purpose of removing constituents, such as benzene, from mainstream smoke. Accordingly, also provided are methods of making cigarette filters and cigarettes including activated carbon.

As used herein, the term "sorption" includes filtration by adsorption and/or absorption. Sorption encompasses interactions on the outer surface of the sorbent, as well as interactions within the pores and channels of the sorbent. In other words, a "sorbent" is a substance that can condense or hold molecules of other substances on its surface, and/or can take up other substances, i.e., through penetration of the other substances into its inner structure, or into its pores. Accordingly, the term "sorbent" as used herein refers to an adsorbent, an absorbent, or a substance that can function as both an adsorbent and an absorbent.

As used herein, the term "remove" refers to adsorption and/or absorption of at least some portion of at least one constituent of a gas stream, such as mainstream tobacco smoke. At least one constituent of a gas stream may be converted to another constituent by a catalytic reaction, which effectively also removes the constituent from the gas stream.

The term "mainstream smoke" includes the mixture of gases that pass down the tobacco rod and issue through the filter end, i.e., the smoke that issues or is drawn from the mouth end of a smoking article during smoking of the smoking article. Mainstream smoke contains air that is drawn in through both the lit region of the smoking article and through the paper wrapper.

"Smoking" of a cigarette means the heating or combustion of the cigarette to form tobacco smoke. Generally, smoking of a traditional cigarette involves lighting one end of the cigarette and drawing the cigarette smoke through the mouth end of the cigarette, while the tobacco contained in the tobacco rod undergoes a combustion reaction. However, a non-traditional cigarette may be smoked by heating the cigarette using an electrical heater, as described, for example, in any one of commonly-assigned U.S. Pat. Nos. 6,053,176; 5,934,289; 5,591,368 and 5,322,075, each of which is incorporated herein by reference in its entirety.

The activated carbon is preferably in the form of beads, more preferably spherical beads, which preferably have a pore structure that is made up substantially of micropores or mesopores. As used herein, a "micropore" has a pore size of about 2 nm (20 Å) or less, and a "mesopore" has a pore size in the range of about 2 to 50 nm (20 Å to 500 Å). The pore size of the activated carbon beads can be chosen based on the selected constituent(s) that is/are desired to be removed from a gas stream, e.g., from mainstream tobacco smoke.

If desired, the activated carbon can be used in combination with one or more catalyst materials in a gas passage, e.g., in a cigarette filter and/or cigarette, to enhance conversion of one or more selected constituents in the gas stream to another gaseous constituent. For example, the catalyst can be any suitable transition metal catalyst, such as $Fe_2O_3$ and/or $Fe_3O_4$. The catalyst can be nano-sized and/or micro-sized. The catalyst can be provided in various components of a cigarette filter, e.g., on the activated carbon as a coating. Alternatively, the activated carbon and the catalyst can be in the form of a physical mixture in the gas passage.

The activated carbon is preferably incorporated in a traditional cigarette or a non-traditional cigarette. For example, the activated carbon can be incorporated in traditional cigarettes or in non-traditional cigarettes, such as cigarettes for electrical smoking systems described in commonly-assigned U.S. Pat. Nos. 6,026,820; 5,988,176; 5,915,387; 5,692,526; 5,692,525; 5,666,976 and 5,499,636, each of which is incorporated herein by reference in its entirety.

The activated carbon beads when loaded in a cavity in a cigarette filter are preferably spherical to achieve a desired resistance-to-draw (RTD). The activated carbon beads can typically have an average diameter in the range of about 200 to 1000 microns, with an average diameter in the range of about 300 to 500 microns activated carbon beads being preferred to achieve a desired RTD. The activated carbon beads are preferably resistant to agglomeration and remain separate and free-flowing, thus allowing for specific packing densities of the activated carbon beads.

In a preferred embodiment, the activated carbon is incorporated in the filter portion of a cigarette. In the filter portion, the activated carbon is preferably incorporated in at least one space and/or void. The activated carbon also can be incorporated in the tobacco bed of a cigarette, such as in a tobacco rod. Embodiments of methods for making cigarettes comprise placing a paper wrapper around a tobacco column to form a tobacco rod, and attaching a cigarette filter to the tobacco rod to form the cigarette, wherein the cigarette filter and/or the tobacco rod contains the activated carbon.

The amount of the activated carbon provided in a cigarette can be varied. For example, about 10 to 200 mg of the activated carbon can typically be used in a cigarette. For example, 10 to 20 mg, 20 to 100 mg, or 100 to 200 mg can be used depending upon the desired effects, type of cigarette, etc. More than 200 mg of activated carbon can also be used if desired. However, such embodiments may have a shorter tobacco rod in order to maintain a certain cigarette length.

FIG. 1 shows an embodiment of a cigarette 10 comprising a tobacco rod 12 and a filter 14 attached to the rod with tipping paper 16. The filter 14 has a plug-space-plug construction with spaced apart plugs 18, 20, that can be cellulose acetate plugs, and a cavity 22 between the plugs 18, 20, which can contain activated carbon beads 24.

In one embodiment, the activated carbon beads 24 have a substantially uniform diameter. Such activated carbon beads can form a bed that allows for minimal channeling of tobacco smoke drawn through the cavity 22. Accordingly, maximum contact can be achieved between mainstream cigarette smoke and the surface of the activated carbon beads.

Figure 2:
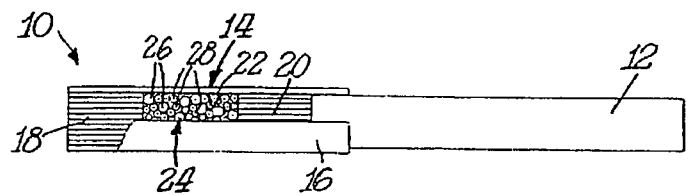
FIG. 2 is a partially-broken away side view of another embodiment of a cigarette comprising a tobacco rod and a filter comprising activated carbon beads.

In another embodiment, the filter cavity 22 can be filled with activated carbon beads of at least two different size fractions. Smaller-size activated carbon beads can pack uniformly between larger activated carbon beads. For example, FIG. 2 shows a filter cavity 22 containing a combination of larger activated carbon beads 26 and smaller activated carbon beads 28 packed uniformly between the larger activated carbon beads 26.

While various embodiments have been described, it is to be understood that variations and modifications may be resorted to as will be apparent to those skilled in the art. Such variations and modifications are to be considered within the purview and scope of the claims appended hereto.

What is claimed is:

1. A method of forming activated carbon from microcrystalline cellulose beads comprising:
   mixing microcrystalline cellulose powder, water and one or more of $H_2SO_4$, $H_3PO_4$ or $ZnCl_2$, wherein a weight ratio of microcrystalline cellulose powder to water is in a range of about 30-70 weight % microcrystalline cellulose powder to about 30-70 weight % water;
   forming cylindrical extrudates from the microcrystalline cellulose powder and water using an extruder;
   forming spherical beads from the cylindrical extrudates using a spheronizer;
   drying the beads;
   carbonizing the microcrystalline cellulose beads to form carbonized microcrystalline cellulose; and
   activating the carbonized microcrystalline cellulose to form activated carbon having pores therein with a majority of the pores less than 30 Å.

2. The method of claim 1, wherein the mixing includes adding sodium or ammonium bicarbonate to the microcrystalline cellulose powder and water and the carbonizing is conducted at a temperature in the range of about 400 to 950° C.

3. The method of claim 1, wherein the activating is conducted at a temperature in the range of about 800 to 950° C. and steam or $CO_2$ is reacted with the carbon to create angstrom sized pores.

4. The method of claim 1, wherein the carbonizing and activating are conducted in a single step.

5. The method of claim 1, further comprising adding one or more selective filtration additives to the microcrystalline cellulose powder and water or impregnating the beads with one or more selective filtration additives.

6. The method of claim 1, further comprising overcoating the microcrystalline cellulose beads prior to carbonizing with synthetic or natural polymer solutions or dispersions.

7. The method of claim 1, further comprising overcoating the microcrystalline cellulose after carbonizing but prior to activating with synthetic or natural polymer solutions or dispersions.

8. The method of claim 1, further comprising overcoating the microcrystalline cellulose after activating with synthetic or natural polymer solutions or dispersions.

9. The method of claim 1, wherein the activated carbon comprises activated carbon beads.

10. The method of claim 9, wherein the activated carbon beads are of a practically spherical shape.

11. The method of claim 9, wherein the activated carbon beads have pores therein, comprising: a micropore volume calculated using Density Functional Theory (DFT) in the range of about 0.2 to 1.0 cm³/g for pores in the range of about 5 to 10 Å.

12. The method of claim 9, the activated carbon beads comprising
    a majority of the pores less than about 20 Å;
    a micropore volume calculated using Density Functional Theory (DFT) in the range of about 0.3 to 1.0 cm³/g for pores in the range of about 5 to 10 Å;
    BET (Brunauer, Emmett and Teller) surface area in the range of about 1,000 to 3,000 m²/g; and
    an average diameter in the range of about 200 to 1000 microns.

13. The method of claim 9, the activated carbon beads comprising
    a majority of the pores less than about 10 Å;
    BET (Brunauer, Emmett and Teller) surface area in the range of about 1,000 to 2,000 m²/g; and
    an average diameter in the range of about 300 to 500 microns.

14. A method of forming a smoking article filter comprising:
    forming activated carbon according to the method of claim 1; and
    forming a smoking article filter comprising the activated carbon.

15. A method of forming a smoking article comprising:
    forming a smoking article filter according to the method of claim 14;
    placing a paper wrapper around a tobacco column to form a tobacco rod; and
    attaching the smoking article filter comprising the activated carbon to the tobacco rod to form a smoking article.

16. The method of claim 15, wherein the activated carbon comprises activated carbon beads having beads of at least two different size fractions.

* * * * *